F. L. BARBER & E. W. WEBB.
SIDE BEARING FOR CARS.
APPLICATION FILED MAR. 20, 1915.
1,185,864.
Patented June 6, 1916.
2 SHEETS—SHEET 1.
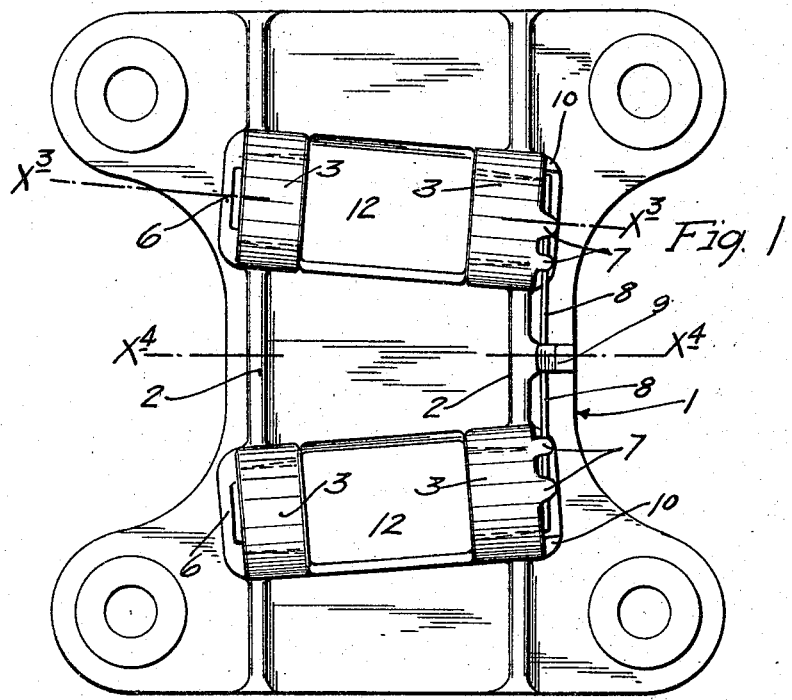
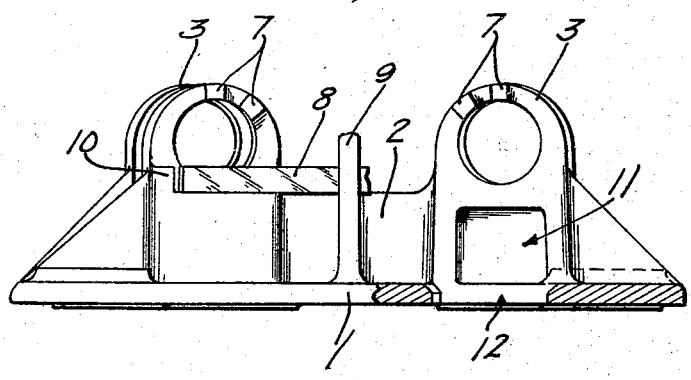
WITNESSES
E. C. Skinkle
A. H. Opoahl
INVENTORS
Franklin L. Barber
Edwin W. Webb
BY THEIR ATTORNEYS

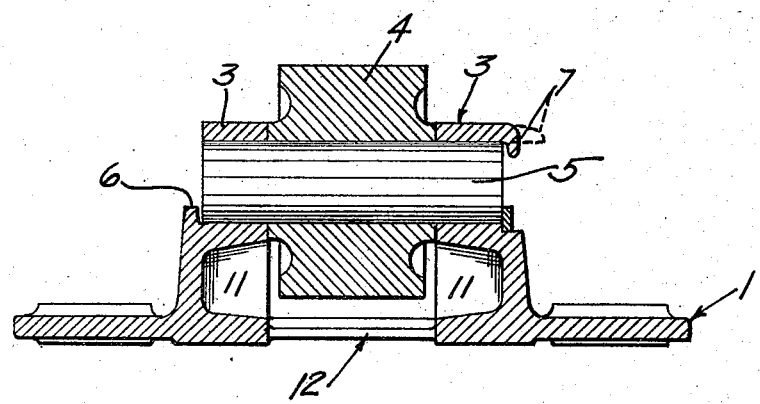
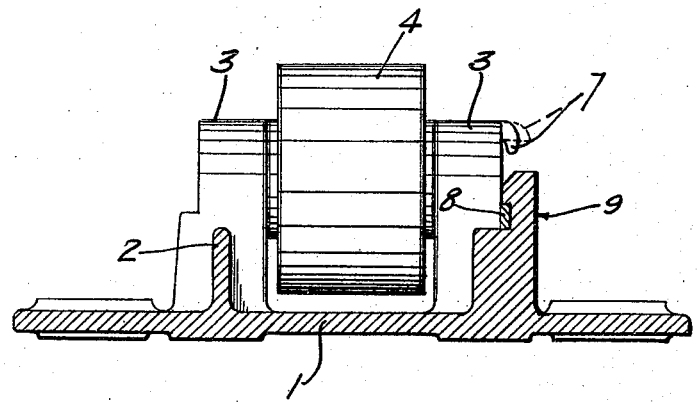

UNITED STATES PATENT OFFICE.

FRANKLIN L. BARBER AND EDWIN W. WEBB, OF CHICAGO, ILLINOIS, ASSIGNORS TO STANDARD CAR TRUCK COMPANY, OF CHICAGO, ILLINOIS, A CORPORATION OF NEW JERSEY.

SIDE BEARING FOR CARS.

1,185,864.      Specification of Letters Patent.      Patented June 6, 1916.

Application filed March 20, 1915. Serial No. 15,828.

*To all whom it may concern:*

Be it known that we, FRANKLIN L. BARBER and EDWIN W. WEBB, citizens of the United States, residing at Chicago, in the county of Cook and State of Illinois, have invented certain new and useful Improvements in Side Bearings for Cars; and we do hereby declare the following to be a full, clear, and exact description of the invention, such as will enable others skilled in the art to which it appertains to make and use the same.

Our invention has for its object to provide an extremely simple and highly efficient roller side bearing for railway cars, and to such ends, generally stated, the invention consists of the novel devices and combinations of devices hereinafter described and defined in the claims.

The invention is illustrated in the accompanying drawings wherein like characters indicate like parts throughout the several views.

Referring to the drawings: Figure 1 is a plan view of the roller side bearing with the rollers and their pins or axles removed; Fig. 2 is a side elevation of the parts shown in Fig. 1 with some parts sectioned and some parts broken away; Fig. 3 is a section taken on the line $x^3$ $x^3$ on Fig. 1, showing a roller and pin in working position; and Fig. 4 is a transverse vertical section taken on the line $x^4$ $x^4$ on Fig. 1, also showing one of the rollers and its pin in working position.

The support and housing for the rollers is a cast structure 1, which may be either of malleable iron or cast steel. It has the usual projecting flanges with bolt holes for anchoring it, and is formed with parallel longitudinal flanges 2. These flanges, preferably at two different points, are formed with sleeve-like pin seats 3 that are axially alined in pairs with the axis of the cars converging so that they will meet at the axis of the car center, not shown.

The rollers 4 are loosely journaled on heavy pins or axles 5 which, in turn, are loosely seated in the alined sleeve-like pin seats 3. The hubs of the said rollers 4 are confined between the axially alined coöperating sleeves 3; and the said sleeves 3, at one side of the bearing, are formed with upwardly projected integrally cast stop flanges 6, while the sleeves 3, at the opposite side of the bearing are formed with lock lips 7. These lock lips 7 normally project parallel to the axis of the pin, as indicated by dotted lines in Fig. 3, and they are adapted to be bent down, as shown by full lines in Fig. 3, to lock the pin against endwise displacement. Preferably, two or more of the flexible or ductile lock lips 7 are applied to said sleeves noted, so that they may be used to lock successive replaced pins. Cast steel or malleable iron has sufficient flexibility or ductility to permit one lip to be bent down without breaking, but straightening thereof to remove a pin and then rebending the same, will usually result in breaking thereof. Hence, the purpose of the several lips on one sleeve for the successive application of pins to support the rollers. As a means for locking the roller pins in their seats, either independently of the lips 7 or in conjuction therewith, I provide a lock bar in the form of a flat spring 8, the intermediate portion of which is adapted to be sprung into engagement with a notch formed for a hook-like lug 9 cast integral with the housing 1, and located about midway between the inside sleeves 3. The upper portion of this lug 9 is preferably beveled so as to assist in forcing the spring into its notch in the said lug. When the said lock bar is applied, as shown in the drawings, its ends overlap the inner ends of the roller pins 5 and prevent the same from being moved endwise out of the said sleeves. The said spring lock bar 8 is held against endwise displacement by stop lugs 10 cast on the sleeves 3 against which the said spring bar is seated. The spring bar, thus seated, cannot possibly become accidentally displaced, but it may, nevertheless, be quite readily removed when the intermediate portion thereof is sprung away from the lug 9, by the use of a bar or other suitable device.

By reference, particularly, to Fig. 3, it will be noted that those portions of the flanges 2 of the housing or base casting which are below the sleeves 3 are undercut or cored out at 11, and also that the plate of the housing is cut through below the rollers, as indicated at 12. In the construction of this housing, the said cavities 11, openings 12, and the pin seats in the sleeves 3 are adapted to be all formed by a single core; and this is highly important, because it insures the pin seats always being on the same level and at the required convergence.

The flexible or ductile pin retaining lips may, if desirable, be applied both to the inner and outer sleeves, but in the preferred arrangement, one of the sleeves would be provided with a rigid relatively fixed stop flange, substantially as illustrated.

The center bearing described is strong and durable and the parts thereof are capable of being easily assembled, or disassembled and replaced. Furthermore, the improved side bearing may be manufactured at comparatively small cost, and is in all respects highly efficient for the purposes had in view.

What we claim is:

1. A side bearing for cars comprising a base having axially alined sleeves affording pin seats, a pin seated in the axially alined sleeves, a roller journaled on said pin, and a laterally displaceable lock bar extending across one of the pin seats and holding the pin against endwise displacement.

2. A side bearing for cars comprising a base having two pairs of axially alined sleeves affording pin seats, pins seated in said sleeves, rollers journaled on said pins, a lug at one side of said base located between the sleeves on that side, and a spring lock bar intermediately interlocked to said lug with its ends projecting across the pin seats of adjacent sleeves and holding the coöperating pins against endwise displacement.

3. A side bearing for cars comprising a base having two pairs of axially alined sleeves affording pin seats, pins seated in said sleeves, rollers journaled on said pins, a lug at one side of said base located between the sleeves on that side, and a spring lock bar intermediately interlocked to said lug with its ends projecting across the pin seats of adjacent sleeves and holding the coöperating pins against endwise displacement, the sleeves, just noted, having lugs beyond the ends of said lock bar holding the latter against endwise displacement.

4. A side bearing for cars comprising a base having two pairs of axially alined sleeves affording pin seats, pins seated in said sleeves, rollers journaled on said pins, a lug at one side of said base located between the sleeves on that side, and a spring lock bar intermediately interlocked to said lug with its ends projecting across the pin seats of adjacent sleeves and holding the coöperating pins against endwise displacement, the sleeves remote from said lock bar having integral stop flanges projecting across the pin seats thereof and affording pin stops.

5. In a side bearing for cars, the combination with a base having axially alined sleeves affording pin seats, of a pin extended axially through and seated in said sleeves, and a roller journaled on said pin, said pin being endwise removable from said roller, and the said sleeves having integral pin stops, at least, one of which is in the form of a flexible lip bent over into the zone of the pin seat and holding said pin against endwise displacement from said sleeves and roller.

In testimony whereof we affix our signatures in presence of two witnesses.

FRANKLIN L. BARBER.
EDWIN W. WEBB.

Witnesses:
HARRIETT E. ORR,
J. L. MILNER.

Copies of this patent may be obtained for five cents each, by addressing the "Commissioner of Patents, Washington, D. C."